(12) United States Patent
Chang et al.

(10) Patent No.: US 6,631,098 B2
(45) Date of Patent: Oct. 7, 2003

(54) DUAL-MODE MP3 PLAYER

(75) Inventors: Chin-Yao Chang, Taipei (TW); Wen-Hwa Chou, Taipei (TW)

(73) Assignee: Prolific Technology Inc., Taipei (TW)

( * ) Notice: Subject to any disclaimer, the term of this patent is extended or adjusted under 35 U.S.C. 154(b) by 165 days.

(21) Appl. No.: 09/895,166

(22) Filed: Jul. 2, 2001

(65) Prior Publication Data
US 2003/0002395 A1 Jan. 2, 2003

(51) Int. Cl.[7] ............................................... H04H 9/00
(52) U.S. Cl. ................... 369/7; 369/2; 369/21
(58) Field of Search .......................... 369/2, 6, 7, 1, 369/10–12, 25, 21, 4, 20, 22, 19; 320/114; 360/72.2, 7

(56) References Cited
U.S. PATENT DOCUMENTS 6,061,306 A * 5/2000 Buchheim ...................... 369/2
6,252,830 B1 * 6/2001 Hsu .............................. 369/25
6,292,440 B1 * 9/2001 Lee ............................... 369/7
6,316,912 B1 * 11/2001 Murphy ....................... 320/114

* cited by examiner

Primary Examiner—Ali Neyzari
(74) Attorney, Agent, or Firm—Sughrue Mion, PLLC

(57) ABSTRACT

"A portable MP3 player has two operation modes. In a first mode, the portable MP3 player operates independently. A controller in the MP3 player reads first MP3 files from internal memory and a MP3 decoder is utilized for decoding the MP3 files. In addition, the audio data are output to an earphone or a speaker. In a second mode, a ducking station is provided for placing the portable MP3 player, which has an extended memory device, e.g. CD-ROM, for storing second MP3 files. The controller of the portable MP3 player accesses the second MP3 files via interfaces that are connected when the portable MP3 player is placed on the ducking station. The MP3 decoder of the portable player is also utilized to decode the second MP3 files and the corresponding audio data are output through the ducking station."

5 Claims, 3 Drawing Sheets

DUAL-MODE MP3 PLAYER

BACKGROUND OF THE INVENTION

1. Field of the Invention

The present invention relates to an MP3 player device, more particularly, to an MP3 player with large storage.

2. Description of the Prior Art

Developments of all assortments of audio players and storage for audio data are progressing up date owing to the need of human kinds for audio storing. Especially under the drive of the needs for audio devices of the Internet and multimedia, efforts are further made to audio players and storage for audio data to make them with higher quality, higher stored capacity, and more convenient for use. The storage for audio data and audio players in the market are in sequence a phonograph disk and a phonograph player, a magnetic recorded tape and a magnetic recorders, a compact disk (CD) and a CD-ROM, a digital versatile disk (DVD) and a DVD ROM, and flash ROM and an MP3 player.

Magnetic recorded tapes are not able to be sustained for a long time, and are easy to be demagnetized by ultra-violet ray, plus their small capacities and being sensitive to noise signals which make the magnetic recorded tapes gradually decline on the market. In a CD-ROM, a laser light incidents a compact disk and reflexes back to an optical pickup head through the disk with audio data molded in. The reflex optical signals and thus the audio signals are digital, and which considerably make the signals themselves immune to noise, and thereby high audio quality is achieved. The disk is easy to conserve, with high capacity, low in cost, immune to interference of noise; which make the storage itself and the associated player extremely popular on the market and cut the first edge.

An MP3 player is much easier to use for music listening. The audio data are specifically compressed and stored in a semiconductor memory, such as ROM, EPROM and flash ROM. Although an MP3 player is small in dimension, easy to carry, the memory it uses costs very high as compared to compact disks. Generally, the size of the memory used for an MP3 player is 16 MB, and which is corresponding to a 15-minute period of length. To update the data in a small-sized memory for an MP3 player, a computer is needed to do write or rewrite audio data to the MP3 player. To increase the capacity of a memory of an MP3 player, added-on cards can be inserted into the player, but the cost needed is just sharply risen.

Consequently, a small-sized, light, capacious, easy-used, and low-priced storing device for audio data and a player has become the goal of the researchers' and users'. MP3 players have received widely popularity since its open to the market. If the bottleneck for small storing space on MP3 players has a breakthrough, then MP3 players will be provided with all advantages as mentioned above. For that reason, how to improve MP3 players has drawn much attention from the insiders and symbolized the progress of audio processes in electronic industry.

SUMMERY OF THE INVENTION

In view of the shortcoming a conventional MP3 player suffers, the present invention suggests a combined MP3 player machine with a large memory that can be accessed by the controller of the MP3 player.

In this invention, compact disks (recordable compact disk, re-writable compact disk, hard disk) are utilized as the memory and a CD-ROM (CD-R, CD/RW, Hard disk, etc.) is positioned as the ducking station of the MP3 player by use of combining the MP3 player and the CD-ROM. The CD-ROM is self-powered, and thus separated from a computer. The MP3 player is fabricated on the CD-ROM and can be independent and detachable from the CD-ROM. When they connect together, audio data can transmit to the MP3 player from the CD-ROM through the interface between them; such as USB, EPP, SCSI, IDE, and the like; and capacious storage is well provided. When the combined machine is connected to a computer through an interface, the MP3 player can be programmed through the USB (RS232, EPP, SCSI, IDE, etc.) interface of the CD-ROM, since the USB (RS232, EPP, SCSI, IDE, etc.) port of the MP3 player is locked and bypassed to the USB (RS232, EPP, SCSI, IDE, etc.) port of the CD-ROM. When the combined machine plays, the audio signal of the MP3 to the earphone or speaker is locked and bypassed to the earphone or speaker of the CD-ROM. When the MP3 player is extracted from the combined machine, it can be a player itself. The consumer, the combined MP3 player with a large memory, and the computer are well integrated, and the capacious memory for the MP3 player is perfectly achieved by bridging over the MP3 player and the compact disks.

BRIEF DESCRIPTION OF THE DRAWINGS

In order that the invention may be more clearly understood, it will now be disclosed in greater detail when taken in conjunction with the accompanying drawings, wherein.

DESCRIPTION OF THE PREFERRED EMBODIMENT

To settle the limited memory issue on a conventional MP3 player, the present invention provides herein a large memory for the MP3 player without needing high cost.

Figure 1:
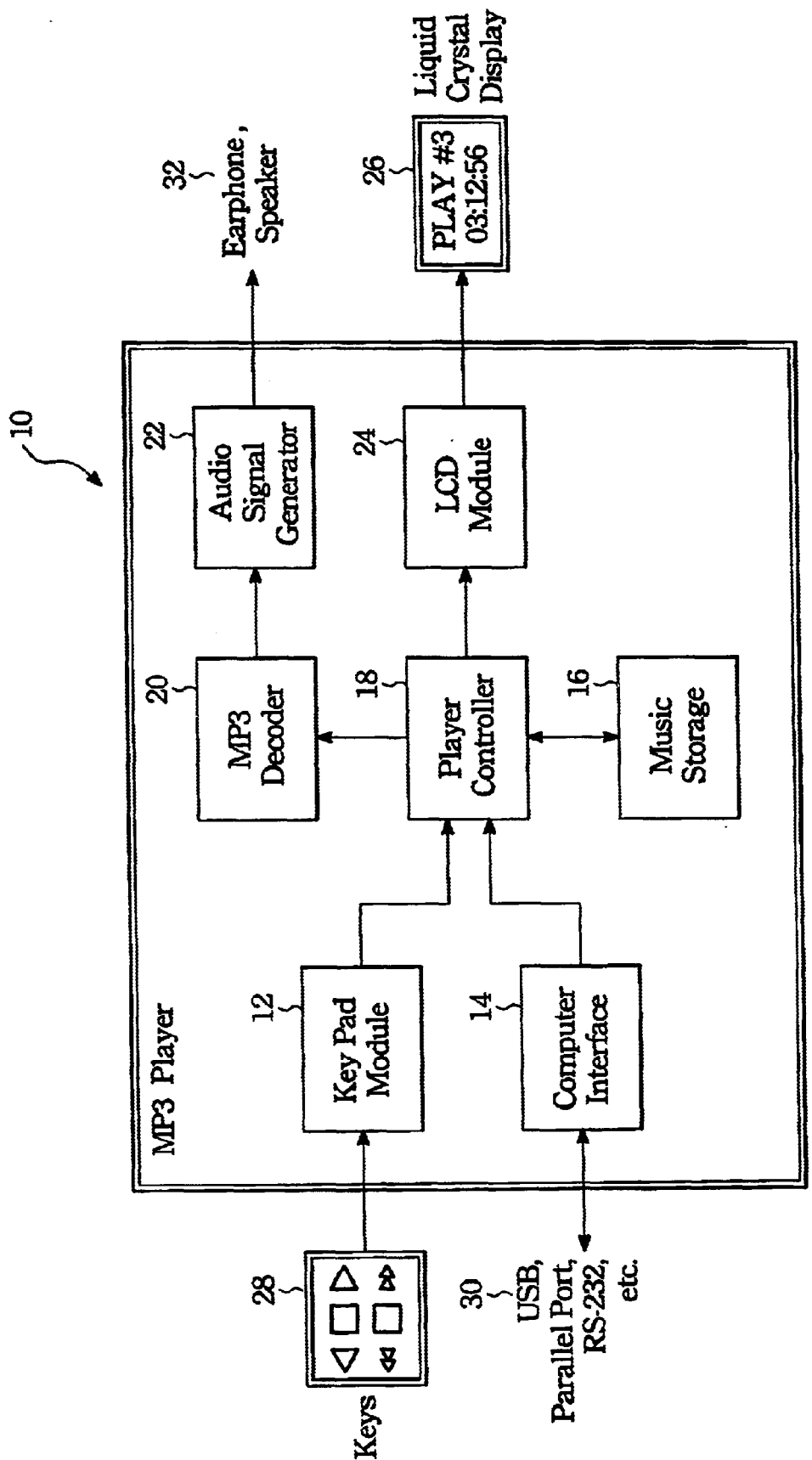
FIG. 1 is the function block of the MP3 player of the prior art.

Referring to FIG. 1, which depicts a function block of the MP3 player used in prior arts. The audio data storage 16 is typically flesh ROM (ROM, or EPROM is allowed also), and with a size of 16 MB, which is unsatisfied for current use. With the use of an external memory card (not shown for simplicity), the cost may be very high and thus not practicable. Furthermore, when updating new music or audio data for the MP3 player 10, a connection with a computer is needed. In the prior art, the computer can program the internal storage 16 through the interface port 30 to the computer interface 14 in the MP3 player 10. Since the MP3 audio data is specifically compressed, the audio data fetched from the storage 16 by the player controller 18 is fed into the MP3 decoder 20 for decoding. The decoded audio data are then fed into the audio signal generator 22, and then outputted to the earphone or speaker 32.

In this invention, an MP3 ducking station is combined with the MP3 player in prior arts to obtain a combined machine (shown in FIG. 2) with a large memory. For the profile of the combined machine, see FIG. 3. The ducking station 40 is located below the MP3 player 10, and they jointly form a combined machine 50. The combined machine 50 is self powered or can be optionally powered by a computer when they are connected. The ducking station 40 can be CD-ROM, CD-R, CD/RW or a hard disk, all of which are able to provide mass storage for the MP3 player 10. A computer can program the MP3 player 10 through the USB (EPP, SCSI, IDE, or RS232, etc.) interface of the CD-ROM 40 since the USB (EPP, RS232, SCSI, or IDE, etc.) port 30 of the MP3 player 10 is locked and bypassed to the USB (EPP, SCSI, RS232, or IDE, etc.) port 44 of the CD-ROM 40 when the MP3 player 10 is placed on the CD-ROM 40 for use. Similarly, the signal generated from the audio signal generator 22 of the MP3 player 10 is locked and bypassed to the earphone or speaker 42 of the CD-ROM 40 for the combined machine so that audio can be outputted from the earphone or speaker 42 of the CD-ROM 40 since the CD-ROM is provided with a higher power speaker. For the combined machine 50 itself, the controller of the MP3 player 10 can read the audio data stored in the compact disk (now shown) through the interface (USB, IDE, SCSI, EPP, RS232, etc.) between them, which will be explained in more detail, and thus obtain a large memory since the compact disk is capacious and can be enlarged by use of a plurality of disks. The MP3 10 itself is self-powered or powered by the ducking station 40 when they are connected. The MP3 10 is optionally detachable from the combined machine 40 and work as a player.

Figure 2:
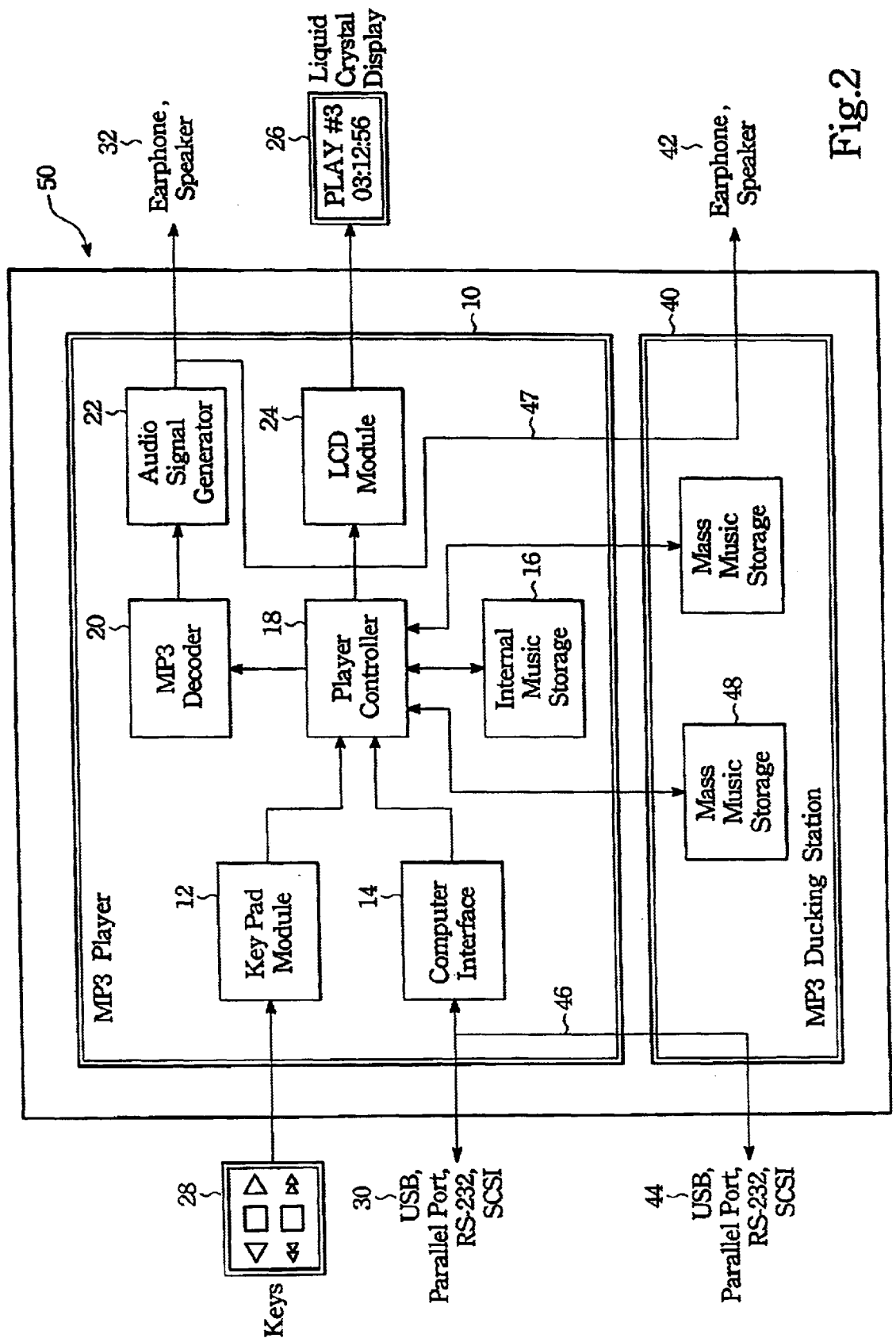
FIG. 2 is the function block of the combined machine according to the present invention.
Figure 3:
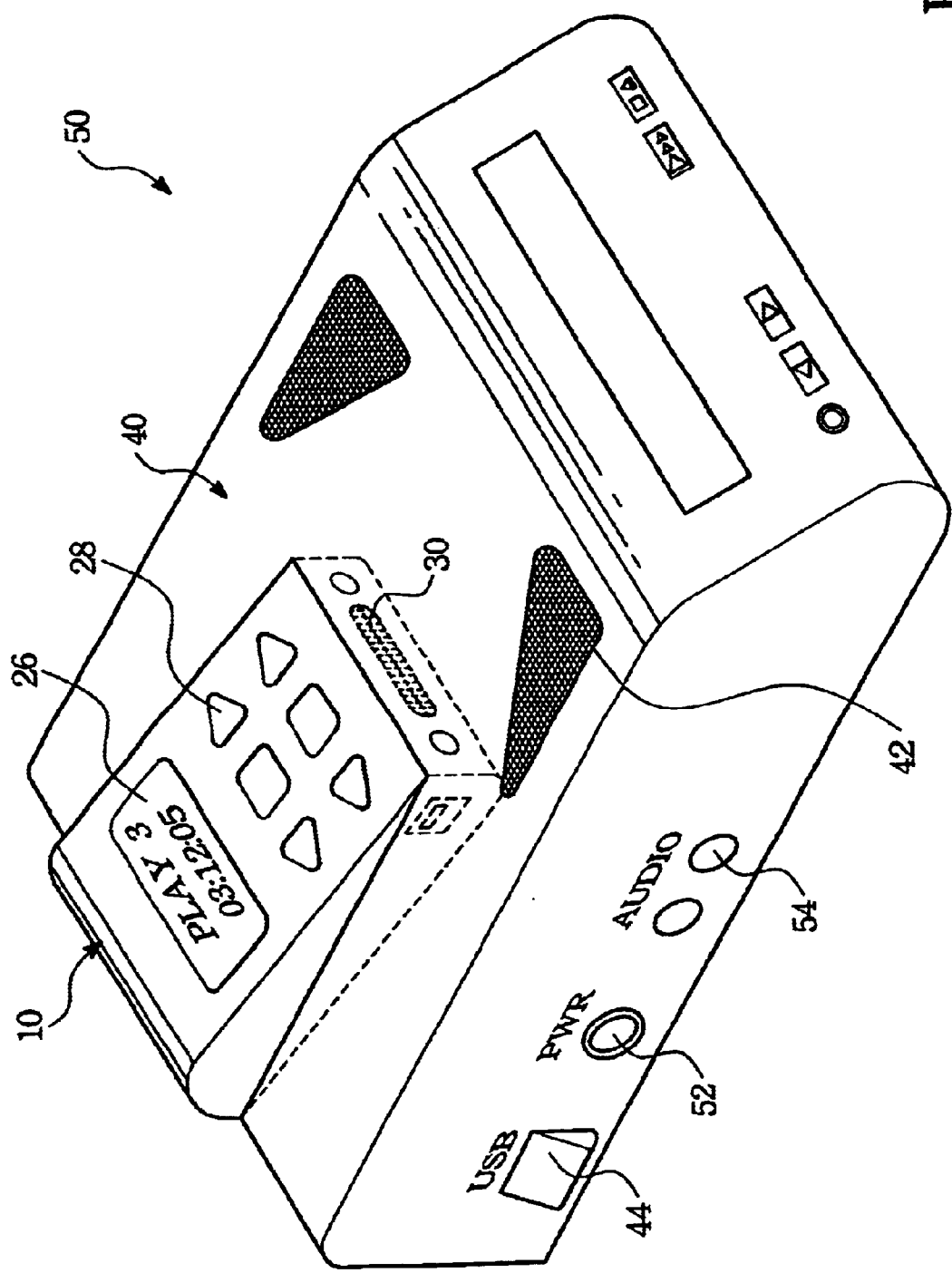
FIG. 3 is the left-sided elevated view of the profile of the combined machine according to the present invention.

Continuing back to FIG. 2, the player controller 18 can not only address the internal storage 16, but also the storage in the ducking station 40. The controller 18 issues an address signal for read, the internal storage 16 or the storage 48 in the sucking station 40 addressed then transmits the audio data requested by the controller 18 to the decoder 20, since the MP3 data is specifically compressed. The audio signal generator 22 is then charge of outputting audio through the earphone or speaker 32.

Continuing to FIG. 2, besides the strategy programming the storage 16 of the MP3 player 10 through the USB port 30 from a computer, the computer can program the internal storage 16 of the MP3 player 10 through the bypass 46, which is extended from the USB interface 30 of the MP3 10 to the interface 44 of the ducking station 40. With the bypass 46, programming from the computer to the internal storage 16 of the combined body is possible. Similarly, the audio signal to the earphone or speaker 42 of the ducking station 40 is obtained through the bypass 47 from the audio signal generator 22 in the MP3 player 10, since the CD-ROM has a higher power speaker.

Since the controller 18 can access the internal storage 16 and the storage 48 in the ducking station 40, a large memory equipped MP3 player is thus achieved, and a consumer, the combined MP3 player with a large memory, and a computer is thus integrated together.

As is understood by a person skilled in the art, the foregoing preferred embodiments of the present invention are illustrated of the present invention rather than limiting of the present invention. It is intended to cover various modifications and similar arrangements included within the spirit and scope of the appended claims, the scope of which should be accorded the broadest interpretation so as to encompass all such modifications and similar structure.

What is claimed is:

1. A dual-mode MP3 player assembly, comprising:
    a ducking station comprising:
        a connecting base;
        a first interface with one end connected to said connecting base; and
        at least one extended memory device for storing a plurality of first MP3 files, wherein another end of said first interface is connected to said extended memory device; and
    a portable MP3 player comprising:
        a housing having a connecting portion selectively placed on said connecting base of the ducking station;
        an internal memory within the housing for storing a plurality of second MP3 files;
        a MP3 decoder within the housing for decoding the first MP3 files and the second MP3 files to generate corresponding decoded data;
        an audio generator within the housing connected with said MP3 decoder for generating audio signals to drive a speaker or an earphone according to the decoded data;
        a second interface with one end connected to the connecting portion of the housing, wherein the second interface is connected to the first interface when the housing is placed on the connecting base of the ducking station;
        a controller connected to the internal memory, the MP3 decoder and the second interface, wherein if the housing is placed on the connecting base of the ducking station, the controller accesses the first MP3 files on the extended memory device via the second interface and the first interface, and the controller transmits the first MP3 files to the MP3 decoder to play the first MP3 files, and if the housing is not placed on the connecting base of the ducking station, the controller accesses the second MP3 files from the internal memory and the second MP3 files are transmitted to the MP3 decoder and the audio generator to play the second MP3 files.

2. The MP3 player assembly of claim 1, wherein the ducking station further comprises an outlet connected to an ear phone or a speaker and the outlet is connected to the portable MP3 player via the connecting base of the ducking station when the portable MP3 player is placed on the ducking station.

3. The MP3 player assembly of claim 1, wherein the ducking station further comprises an internal speaker connected to the portable MP3 player via the connecting base of the ducking station when the portable MP3 is placed on the ducking station.

4. The MP3 player assembly of claim 1, wherein the first interface and the second interface comprise USB(EPP, RS232, parallel port, serial port, SCSI, etc.).

5. The MP3 player assembly of claim 1, wherein the extended memory device is a CD-ROM, a CD/RW, a CD-R or a hard disk.

* * * * *